United States Patent
Sarangapani et al.

(10) Patent No.: US 10,459,829 B2
(45) Date of Patent: Oct. 29, 2019

(54) OVERALL TEST TOOL MIGRATION PIPELINE

(71) Applicant: M/S. Cigniti Technologies Limited, Hyderabad (IN)

(72) Inventors: Rajesh Sarangapani, Hyderabad (IN); Kasi Viswanath Kurva, Gadwal (IN); Suneel Kumar Rallapalli, Chittoor (IN)

(73) Assignee: M/s. Cigniti Technologies Limited, Hyderabad (IN)

( * ) Notice: Subject to any disclaimer, the term of this patent is extended or adjusted under 35 U.S.C. 154(b) by 0 days.

(21) Appl. No.: 15/619,619

(22) Filed: Jun. 12, 2017

(65) Prior Publication Data

US 2018/0357145 A1   Dec. 13, 2018

(30) Foreign Application Priority Data

Jun. 7, 2017  (IN) .............................. 201741020046

(51) Int. Cl.
*G06F 11/36*   (2006.01)
*G06F 8/51*   (2018.01)
(Continued)

(52) U.S. Cl.
CPC .............. *G06F 11/368* (2013.01); *G06F 8/36* (2013.01); *G06F 8/42* (2013.01); *G06F 8/423* (2013.01);
(Continued)

(58) Field of Classification Search
CPC .................................................. G06F 8/42–51
See application file for complete search history.

(56) References Cited

U.S. PATENT DOCUMENTS

| | | | |
|---|---|---|---|
| 4,309,756 A | * | 1/1982 | Beckler ..................... G06F 8/41 717/155 |
| 4,374,408 A | * | 2/1983 | Bowles ..................... G06F 8/41 717/137 |

(Continued)

OTHER PUBLICATIONS

Lewis et al., Service-Oriented Migration and Reuse Technique (SMART), published by IEEE, Proceedings of the 13th IEEE International Workshop on Software Technology and Engineering Practice (STEP'05), pp. 1-8 (Year: 2005).*

(Continued)

*Primary Examiner* — Thuy Dao
*Assistant Examiner* — Zheng Wei
(74) *Attorney, Agent, or Firm* — Laurence P. Colton; Smith Tempel Blaha LLC

(57) ABSTRACT

A generic Test Tool migration system that migrates test cases from one platform to another in different Languages and also incorporate best practices while migration. The system comprises of three phases, a pre-processor, an in-flight module, and a post-processor. The pre-processor scans and reads the entire Source code and passes the output to the in-flight module which converts the Source scripts to a neutral Language and generates a Target Language. The output of the process becomes the input to the post-processor that provides options for resolving the ambiguity, issues, and warnings with best practice suggestions to a user by the Smart (migration) Remedy Engine (SME). The translated code is further improved, validated, reported and logged. The output of the phase is converted Object Repositories, Test Data and Scripts.

4 Claims, 9 Drawing Sheets

(51) Int. Cl.
*G06F 8/76* (2018.01)
*G06F 8/41* (2018.01)
*G06F 8/36* (2018.01)

(52) U.S. Cl.
CPC .............. *G06F 8/43* (2013.01); *G06F 8/433* (2013.01); *G06F 8/437* (2013.01); *G06F 8/51* (2013.01); *G06F 8/76* (2013.01)

(56) References Cited

U.S. PATENT DOCUMENTS

| | | | | |
|---|---|---|---|---|
| 4,931,928 A * | 6/1990 | Greenfeld | ............... | G06F 8/427 707/999.003 |
| 5,187,789 A * | 2/1993 | O'Hair | ............... | G06F 8/20 |
| 5,230,049 A * | 7/1993 | Chang | ............... | G06F 17/30569 707/E17.006 |
| 5,293,629 A * | 3/1994 | Conley | ............... | G06F 8/75 717/114 |
| 5,586,020 A * | 12/1996 | Isozaki | ............... | G06F 8/42 717/143 |
| 5,675,801 A * | 10/1997 | Lindsey | ............... | G06F 8/30 717/108 |
| 5,826,256 A * | 10/1998 | Devanbu | ............... | G06F 8/30 |
| 5,842,204 A | 11/1998 | Andrews | | |
| 5,875,331 A * | 2/1999 | Lindsey | ............... | G06F 8/10 717/108 |
| 6,006,031 A * | 12/1999 | Andrews | ............... | G06F 8/51 717/137 |
| 6,317,871 B1 * | 11/2001 | Andrews | ............... | G06F 8/51 717/137 |
| 6,425,118 B1 * | 7/2002 | Molloy | ............... | G06F 8/51 717/136 |
| 6,502,102 B1 * | 12/2002 | Haswell | ............... | G06F 11/3664 |
| 6,536,037 B1 * | 3/2003 | Guheen | ............... | G06F 8/71 703/2 |
| 6,877,155 B1 * | 4/2005 | Lindsey | ............... | G06F 8/10 717/107 |
| 7,272,821 B2 * | 9/2007 | Chittar | ............... | G06F 8/51 717/116 |
| 7,467,375 B2 * | 12/2008 | Tondreau | ............... | G06F 8/51 717/137 |
| 8,051,410 B2 * | 11/2011 | Marfatia | ............... | G06F 8/76 717/124 |
| 8,359,568 B2 * | 1/2013 | Baumann | ............... | G06F 8/24 707/625 |
| 8,683,451 B1 * | 3/2014 | Cox | ............... | G06F 8/44 717/124 |
| 8,984,497 B2 * | 3/2015 | Takeuchi | ............... | G06F 8/51 717/137 |
| 9,037,965 B2 * | 5/2015 | Sarangapani | ....... | G06F 11/3608 715/201 |
| 9,052,966 B1 * | 6/2015 | Quinlan | ............... | G06F 8/51 |
| 9,053,238 B2 * | 6/2015 | Krishnan | ............ | G06F 11/3664 |
| 9,086,931 B2 * | 7/2015 | Vargas | ............... | G06F 8/51 |
| 9,189,504 B2 * | 11/2015 | McGillin | ............ | G06F 16/214 |
| 9,280,332 B2 * | 3/2016 | Koseki | ............... | G06F 8/51 |
| 9,317,255 B2 * | 4/2016 | Meijer | ............... | G06F 8/24 |
| 9,411,581 B2 * | 8/2016 | Peled | ............... | G06F 8/76 |
| 9,465,608 B2 * | 10/2016 | Araya | ............... | G06F 8/447 |
| 9,703,554 B2 * | 7/2017 | Eberlein | ............... | G06F 8/73 |
| 10,061,573 B2 * | 8/2018 | Araya | ............... | G06F 8/76 |
| 2002/0059566 A1 * | 5/2002 | Delcambre | ......... | G06F 17/2264 717/146 |
| 2003/0046029 A1 * | 3/2003 | Wiener | ............... | G06F 11/3672 702/186 |
| 2003/0226132 A1 * | 12/2003 | Tondreau | ............... | G06F 8/51 717/116 |
| 2004/0158820 A1 * | 8/2004 | Moore | ............... | G06F 8/51 717/136 |
| 2005/0138606 A1 * | 6/2005 | Basu | ............... | G06F 8/30 717/136 |
| 2006/0156287 A1 * | 7/2006 | Vikram | ............... | G06F 11/3684 717/124 |
| 2006/0230319 A1 * | 10/2006 | Ryali | ............... | G06F 11/3684 714/38.14 |
| 2007/0256058 A1 | 11/2007 | Marfatia | | |
| 2007/0266165 A1 * | 11/2007 | Li | ............... | G06F 8/71 709/230 |
| 2008/0320054 A1 * | 12/2008 | Howard | ............... | G06F 8/51 |
| 2009/0217302 A1 * | 8/2009 | Grechanik | ............... | G06F 8/70 719/320 |
| 2009/0249310 A1 * | 10/2009 | Meijer | ............... | G06F 8/24 717/136 |
| 2010/0162204 A1 * | 6/2010 | Baumann | ............... | G06F 8/24 717/106 |
| 2013/0174131 A1 * | 7/2013 | Takeuchi | ............... | G06F 8/51 717/137 |
| 2013/0212461 A1 * | 8/2013 | Sarangapani | ....... | G06F 11/3608 715/234 |
| 2013/0298111 A1 * | 11/2013 | Koseki | ............... | G06F 8/51 717/137 |
| 2014/0208290 A1 * | 7/2014 | McGillin | ............... | G06F 16/214 717/106 |
| 2015/0082290 A1 * | 3/2015 | Peled | ............... | G06F 8/51 717/137 |
| 2015/0227498 A1 * | 8/2015 | Sarangapani | ....... | G06F 11/3608 715/234 |
| 2015/0286555 A1 * | 10/2015 | Neravati | ............... | G06F 11/3684 714/38.1 |
| 2015/0347279 A1 * | 12/2015 | Sethu | ............... | G06F 11/3684 714/38.1 |
| 2017/0161061 A1 * | 6/2017 | Eberlein | ............... | G06F 8/73 |
| 2017/0192758 A1 * | 7/2017 | Apte | ............... | G06F 8/427 |
| 2018/0039490 A1 * | 2/2018 | Gass | ............... | G06F 8/65 |
| 2018/0329700 A1 * | 11/2018 | Doshi | ............... | G06F 8/75 |

OTHER PUBLICATIONS

Peter Mathias Pirkelbauer, Programming Language Evolution and Source Code Rejuvenation, published by Texas A&M University, pp. 1-267 (Year: 2010).*

* cited by examiner

| Source | Target |
|---|---|
| Dim a=10 | int a=10; |

Figure 4a

| Source | Target |
|---|---|
| const a=10 | public static final int a=10; |

Figure 4b

| Source | Target |
|---|---|
| If a > b AND a > c Then<br>    MsgBox "a is greater"<br>ElseIf b>c AND b>a Then<br>    MsgBox "b is greater"<br>Else<br>    MsgBox "c is greater"<br>End If | if (a>b && a>c) {<br>    System.out.println("a is greater");<br>} else if (b>c && b>a) {<br>    System.out.println("b is greater");<br>} else {<br>    System.out.println("c is greater");<br>} |

Figure 4c

| Source | Target |
|---|---|
| For i = 1 To 5 Step 1<br>    MsgBox i<br>Next | for (int i=1;i<=5;i++) {<br>    System.out.println(i);<br>} |

Figure 4d

| Source | Target |
|---|---|
| FOR, WHILE, dim | Int, float, static, while |

Figure 4e

| Source | Target |
|---|---|
| Sub Test<br>    print "hello"<br>End Sub<br><br>Function add(a,b)<br>    return a+b<br>End Function | public void Test() {<br>    System.out.println("hello");<br>}<br><br>public int add(int a, int b) {<br>    return a+b;<br>} |

Figure 4f

| Source | Target |
|---|---|
| In UFT, its stored in .tsr or .xml fil | In selenium there is no object repository concept |

Figure 4g

OVERALL TEST TOOL MIGRATION PIPELINE

STATEMENT OF RELATED APPLICATIONS

We claim priority from Indian Patent 201741020046 filed on 7 Jun. 2017

BACKGROUND OF THE INVENTION

There are many test tools available in the market, but the choice depends on the requirement of the tester. SELENIUM and Unified Functional Testing (Quick Test Professional (QTP)) are the two popular test tools. These tools help testers to perform an automated functional testing seamlessly, without monitoring, once script development is complete. QTP is a functional testing tool, which is best suited for regression testing of the applications. QTP is a licensed or a commercial tool owned by Hewlett-Packard (HP), which is one of the most used tools available in the market. It compares the actual and the expected result and reports the results in the execution summary [5]. SELENIUM is a free (open Source) automated testing suite for Web applications across different browsers and platforms. It is quite similar to HP Quick Test Pro (QTP now UFT) only that SELENIUM focuses on automating Web-based applications [6]. Both of these tools executes the test cases (written in standard programming Languages, for example, VBScript, C#, JAVA, etc.), test suites and helps to report execution status (success or failure) of test cases. Testing done using SELENIUM tool has been referred as SELENIUM Testing. The other used testing tools, to name a few are TestPlant eggPlant Functional, Ranorex, Sauce Labs, Borland SilkTest, and Telerik Test Studio. Our invention proposes a system and method for test tool migration between one or more Source and Target Languages, in automation testing

TECHNICAL FIELD

This invention relates to the migration of test scripts across platforms while incorporating best practises during the migration process.

PRIOR ART

US 20070256058A1 titled "Apparatus for migration and conversion of software code from any source platform to any target platform" describes an apparatus that migrates and also convert the Source code from one platform to another, in the format of the Target platform. It consists of a way of taking input in ASCII, and the input analysed for the business logic. It also has a method to analyse the Source code, a set up to generate custom knowledge base and a process to convert Source code into the format of the Target code. It generates reports at the time of process review and a summary report that contains the code, which is not converted automatically, at the end of the conversion process.

U.S. Pat. No. 5,842,204 titled "Method and Apparatus for Translating Source code from one High-level computer Language to another" describes a method and an apparatus for a computer-implemented method in a computer system that modifies the list of elements that is ordered by traversing the first and the second ordered list in an in-order manner that produces a yield of elements and comparing them both. The identification of the first and the second sub-list of elements from the two yields have to be done, so that removal of the sub-list from the yield cause the first and second removal-modified yields to be same. Removal of first sub-list from the first list creates the former position of the first sub-list. The computer system comprises a processor, bus, coupling, and a storage medium. The apparatus for modifying the ordered list contains a traverse, a comparator, an identifier, a remover and an inserter.

The present invention migrate the code from one Language to another and from one platform to another, by considering the best practises of migration.

BRIEF SUMMARY OF THE INVENTION

The present invention is a system for test tool migration between one or more Source and Target Languages, in automation testing with a pre-processing module, an in-flight module and a post-processing module having Source Code as input that includes an Object Repository, a Test Data, and Test Scripts. The pre-processing module is responsible for reading the basic configuration like input, output locations for the files to convert, analysing the Source and finding the dependencies of the resources. The second step of this module is the key phase where actual conversion happens. At the in-flight module, the processor generates various key templates; Library file to output location and the converted files will be copied to an appropriate location. The third phase is more to improve the converted scripts, validate, report and do the logging. A Source Analyser scans through the entire Source code which is selected for conversion and analyses the various programming artefacts like location, methods, conditions, loops. A Dependency Analyser examines the entire code and captures important information which is useful while migrating from a non-object-oriented programming Language to an object-oriented program. The Compiler does the parsing, and lexing also acquires the grammar of the construct Source file to understand the code created and creates an intermediate component, to be compatible as required. The process is Language independent and thus eases out migration to the required platform.

The migration begins by copying the generated Source code to appropriate location and creates Target project template based on the Target tool selected. Also, adds pre-built Library files related to reports and utility to the created project or solution. The Reference Architecture has inbuilt features such as Object Repository migration, test Data migration from any Source to any Target type. Standardization, Optimization, re-usability and maintainability aspects is taken from the Reference Architecture which are created over time and used as a basis to modernize the current automation, in such a way for easy maintenance and re-use when providing the deliverables. The Target files are generated in the form of the required Target Language or platform based on the provided inputs.

A rule-based linker aids in the generation of the code at Target files generator phase. This will be extremely useful during the migration of the code from the non-object-oriented programming Language to the object-oriented programming Language. Multiple classes might have the same method. But it is important to refer appropriate method from the appropriate object. Utility libraries consist of Library functions including Pre-built Library such as reporting Library, Excel Reader, and Writer. A Target files generator includes Lexical Analyser, Syntax Analyser, Intermediate Code Generator and Extractor that aids in the generation of required files. The stream of characters is read and grouped to meaningful tokens, followed by the creation of a tree like intermediate representation that depicts the grammatical structure of token stream. The Source program is analysed using the syntax tree before generating an intermediate code which is a neutral code and is further converted to the Target Language code. The converted code is further improved, validated, reported and logged.

The invention is a system for test tool migration between one or more Source and Target Languages, in automation testing with a pre-processing module, an in-flight module and a post-processing module having Source Code as input that includes an Object Repository, a Test Data and Test Scripts. A pre-processing module, which takes the Source Code in a Source Language as input and is comprised of an IO Configurator and an Analyser. An in-flight module takes inputs from the pre-processing module and is comprised of a Template Generator and a Converter that work together to produce tool generated raw Source. A post-processing module reads the tool generated raw Source and further comprises a Validator, a Smart (migration) Remedy Engine (SME), a best practise analyser, a TODO resolver to generate Final Scripts in a Target Language, including Technical Logs and Reports for analysis. The pre-processing module further comprises the IO Configurator, which has an IO Configuration Reader, an IO Location Reader and a Sniffer. The Source files are input to the IO Configuration Reader which reads basic settings including UI look and feels settings, default settings and script types from a properties file. The IO Location Reader reads the location of tools, Source files, Object Repositories and Target files. The Sniffer gets the high-level information about the Source Code including the first level of information about the lines of code, functions, files, and the complexity of the code, wherein the Sniffer further scans through the entire Source code that is selected for conversion and analyses the various programming artefacts like location, methods, conditions, and loops. The Analyser consists of a Source Analyser and a Dependency Analyser. The Source Analyser scans the entire Source Code selected for conversion and analyses the various programming artefacts such as methods, conditions, and loops based on the Source Language. The Dependency Analyser examines the Source Code for dependency artefacts based on the Target Language. The module produces intermediate Analysis Reports.

The Dependency Analyser further captures important information which is useful while migrating from a non-object-oriented programming Language to an object-oriented programming Language. The in-flight module further comprises a Template Generator which has a Target Project or Solution File, a Pre-built Library, and a Reference Architecture. The Template Generator creates a template based on a Target Project or Solution File. The Pre-built Library adds some pre-built functions including reporting Library, Excel Reader, and Writer. The Reference Architecture consists of inbuilt features including Object Repository migration, Test Data migration from any Source to any Target type. Standardisation, Optimization, re-usability and maintainability aspects is taken from the Reference Architecture which are created over time and is used as a basis to modernize the current automation, in such a way for easy maintenance and re-use when providing the deliverables and enabling test Data migration from any Source to any Target type. A Converter does the parsing and lexing required to make Source files Language independent and simplifying the migration across the platforms, further comprising (i) an Object Repository Convertor, (ii) a Test Data Convertor, (iii) a Script Convertor, (iv) an Extractor, and (v) a rule-based linker that completes generation of the converted Object Repository, Test Data, and Scripts in a Target Language and forwards this to the post-processor as tool generated Source. The Extractor is responsible for ensuring the integrity of the test framework by referencing the generated files and has a Utility Library Extractor that generates appropriate and supported Library functions based on the Target Language selection. The rule-based linker links them appropriately based on inputs from the Reference Architecture. The in-flight module takes inputs from the pre-processor module from the Sniffer and the Dependency Analyser such that the Converter does parsing and lexing. A Lexer consists of a Lexical Analyser and Syntax Analyser. A Parser includes Semantic Analyser and Intermediate Code Generator and works to make Source file Language independent and simplifies the migration. The Converter reads Language independent code and Language independent Object Repositories and converts them to a neutral Language and then to a Target platform, such that the neutral Language is an intermediate low-level Language which can connect to both Source and Target Languages. The Lexical Analyser reads input, which is then grouped into meaningful tokens as output. The output is then sent to the Syntax Analyser wherein a Parser uses the first component of the tokens produced by the Lexical Analyser to create a tree like intermediate representation that depicts the grammatical structure of token stream. The Semantic Analyser makes the use of the syntax tree and the symbol table's information to check for semantic consistency with Language definition of the Source program and does type checking, where it checks if the operator has matching operands. Post the analysis, the Intermediate Code Generator generates the intermediate code in the process of translating from Source Language to Target Language. The Extractor generates the Target Language code from the neutral Language.

In the present invention, the post-processing module further comprises (a) one or more users, (b) Tool generated Source, (c) a Validator, (d) a best practise analyser, (e) a Smart (migration) Remedy Engine, (f) a TODO Resolver, (g) one or more Final Scripts. The Tool generated raw Source comprises an Object Repository, Test Data and Scripts. The Validator validates the Tool generated raw Source for syntax and semantic errors through a Target Language Compiler, checking the lines of the Source for Target Language Syntax and Target Language Semantics and lists warnings, stack traces and errors. The best practise analyser comprises a Suggestion Library and Training Data that provide inputs on remedying the Tool generated raw Source based on historical Data. The best practise analyser is trained with training data and suggestion library. It analyses the errors and warnings, and do a look-up in the training data and suggestion library for generating the recommendation. The Smart (migration) Remedy Engine consists of Log Engine and a Report Engine that takes inputs from the Training module and produce Technical Logs and Reports to aid (autocorrect) remediation process. The TODO Resolver consists of a user interface and provides options to the user for resolving the ambiguity, issues, and warnings with best practise suggestions. The Final Scripts are generated based on the inputs given by the user in the TODO Resolver.

The method of the system for test tool migration between one or more Source and Target Languages, in automation testing with a pre-processing module, an in-flight module and a post-processing module have Source Code as input that includes one or more Source and Target Object Repositories, Test Data, and Test Scripts. The pre-processing includes the steps of, starting the process by getting the input as Source Code that comprises an Object Repository, a Test Data and Test Scripts which are fed into the pre-processor, organizing the received input suitable for the further process and forwards the output to the Analyser, by settings and the IO Configurator, reading the tools, Source files or locations, Object Repository location and Target file location by the IO Location Reader which is part of the IO Configurator, understanding the complexity of the code when a user selects the Source code to convert and scanning the code showing the users number of lines of code, number of functions, number of files and complexity of the code, is performed by a Sniffer which is also the part of the IO Configurator, passing the Data further for an analysis to the Analyser, scanning the entire Source Code selected for conversion and analysing the various programming artefacts like location, methods, conditions, and loops in the Analyser that includes a Source Analyser, and a Dependency Analyser. Examining the entire code and capturing important information which is useful while migrating from a non-object-oriented programming Language to an object-oriented program is done by the Dependency Analyser. Generating an Analysis Report as an output of the pre-processing and the Data is provided for the in-flight processing. Providing the Data by the Analyser to the in-flight processor consists of a Target Project or Solution File, Pre-built Library and Reference Architecture. In-flight processing including the steps of, creating a template based on the Target Project or Solution File, providing some pre-built Library like reporting Library, Excel Reader, and Writer by the Pre-built Library, migrating Data from any Source to any Target type with the help of inbuilt features like Object Repository migration in the Reference Architecture, ensuring the integrity of test framework by referencing the generated files by the Extractor and the rule-based linker, generating the code at Target files generator phase and the raw Source code as the Object Repository, the Test Data, and the Scripts is generated by the help of the rule-based linker. Post-processing includes the steps of, validating the Data in the post-processor by the Validator that checks the syntax and semantic errors in the generated Source Code through the Target Language Compiler and lists the warnings and errors, bifurcating by the Smart (migration) Remedy Engine into Technical Logs and Reports through its Log Engine and Report Engine, taking inputs from the Suggestion Library and the Training Data, passing the Data further through a TODO Resolver which has a user interface, and generating the Final Scripts and ending the process.

Post remediation, the system shows the errors, warnings and other code that are not converted. Technical User who has knowledge on the target tool will go through them manually and fixes appropriately. However, the suggestions are provided by the system, but it is the end user's decision to accept the suggestion or fixing.

Further, displaying the conversion path, Target Language, Source, and Target location with Source and destination lines of code, with the Project name and the conversion time, along with the line number for the error with error, line number for the warnings along with warnings and shows the Target code converted by the Source code.

BRIEF DESCRIPTION OF THE DRAWINGS

FIGS. 4a-4g shows the conversion of various programming artefacts from a Source to Target Language or platform.

FIG. 4a shows the conversion of variables.

FIG. 4b shows the conversion of constants.

FIG. 4c shows the conversion of Conditional Operators and Conditional statements.

FIG. 4d shows the conversion of various loops.

FIG. 4e shows the conversion of keywords.

FIG. 4f shows the conversion of user Defined methods.

FIG. 4g shows the conversion of Object Repositories and Object Identification mechanism.

FIG. 5a describes the pre-processing.

FIG. 5b describes the in-flight processing.

FIG. 5c describes the post-processing.

DETAILED DESCRIPTION OF THE PREFERRED EMBODIMENTS

Figure 1:
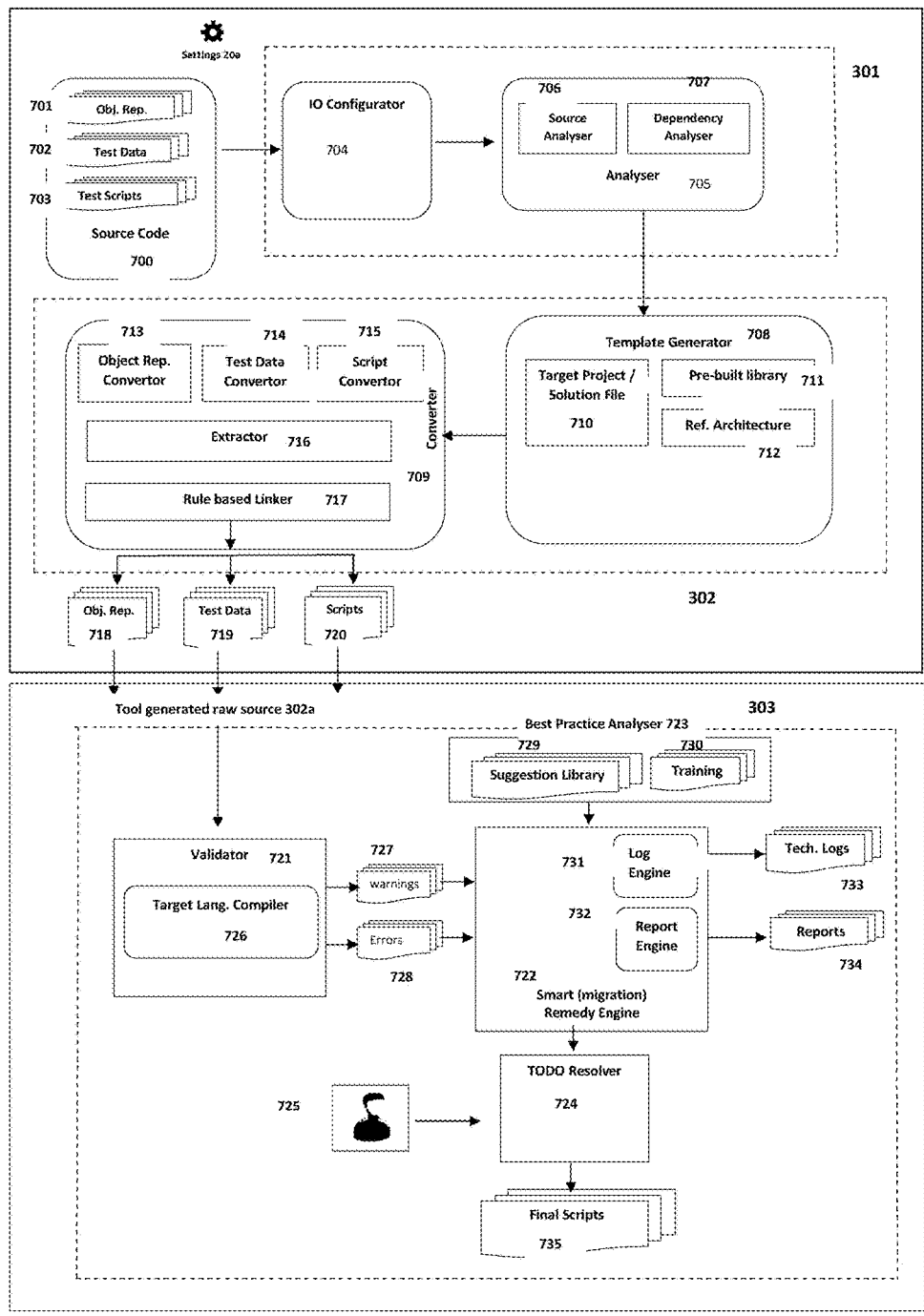
FIG. 1 illustrates the overall system diagram of the invention.

FIG. 1 shows the overall system diagram of the invention. The system consists of a pre-processing module 301, an in-flight module 302 and a post-processing module 303 having Source Code 700 as input that includes an Object Repository 701, Test Data 702 and Test Scripts 703 in the Source Language and Object Repository 718, Test Data 719 and Scripts 720 in a Target Language generated via an intermediate conversion to a neutral Language.

The pre-processing module 301 takes the Source Code 700 in a Source Language as input and is comprised of an IO Configurator 704 and an Analyser 705. The in-flight module 302 takes inputs from the pre-processing module 301 and is comprised of a Template Generator 708 and a Converter 709 that work together to produce Tool generated raw Source 302a. The post-processing module 303 reads the Tool generated raw Source 302a and further comprises a Validator 721, a Smart (migration) Remedy Engine (SME) 722, a best practise analyser 723, a TODO resolver 724 to generate Final Scripts 735 in a Target Language, including Technical Logs 733 and Reports 734 for analysis.

The IO Configurator 704 reads the Source Code 700, the Object Repository 701, Test Data 702, and Test Scripts 703 and sends the same artefacts to the Analyser 705. The IO Configurator 704 has an IO Configuration Reader, an IO Location Reader, and a Sniffer. The IO Configuration Reader reads basic settings 20a such as UI look and feel settings, default settings and script types from a properties file. The IO Location Reader reads the location of tools, Source files, Object Repositories and Target files. The Sniffer gets the high-level information about the Source Code 700 including the first level of information about the lines of code, functions, files, and complexity of the code. Further, the Sniffer scans through the entire Source code that is selected for conversion, and analyses the various programming artefacts such as location, methods, conditions, and loops.

A majority of the test scripts contain Scripts and Object Repositories. The Object Repositories are a list of objects in the application, their references, and test Data, that has to be entered. In the present invention, Source and Target both are Test scripts in different platforms. For example, if the Source is UFT where VBScript is the programming Language, a ".tsr" file is an Object Repository, and a ".xls/.txt/.xml" file contains test Data, and so on. The Target platform also has the same artefacts but possible in one or more different formats.

The Analyser 705 includes two components which are Source Analyser 706 and a Dependency Analyser 707. The Source Analyser 706 scans the entire Source Code 700 selected for conversion and analyses the various programming artefacts such as methods, conditions, and loops based on the Source Language. The Dependency Analyser 707 examines the Source Code 700 for dependency artefacts based on the Target Language. The Dependency Analyser 707 further captures important information which is useful while migrating from non-object-oriented programming Languages to object-oriented programming Languages. For example, a user may choose the Source as UFT (VBScript) and the Target as SELENIUM JAVA or SELENIUM C#, version. The Data is provided by the Analyser 705 to the in-flight module 302. The pre-processing module 301 produces intermediate Analysis Reports 25 (shown in FIG. 2). The Extractor 716 is responsible for ensuring the integrity of the test framework by referencing the generated files (like scripts, object repositories, test Data, reusable Library).

The in-flight module 302 takes the Data provided by the Analyser 705 into the Template Generator 708. The Template Generator 708 comprises a Target Project or Solution File 710, a Pre-built Library 711, and a Reference Architecture 712. The Template Generator 708 generates appropriate templates of Target Language test scripts based on the Target platform selection. For example, if a user chooses to migrate to SELENIUM's JAVA version, then it creates a JAVA project. Similarly, if the user chooses to migrate to SELENIUM C#, then it creates a solution file which can be opened in the Visual Studio. In short, it reads the user input on a Target platform selection and generates an appropriate project template. The output is a Target Project or Solution File 710. Most of the automation test scripts use some functions like reading and writing to the different type of files (xls, xmls, xlsx). These functions are pre-built by and packaged as a part of deliverables that are generated. The Pre-built Library 711 adds some pre-built functions including a reporting Library, an Excel Reader, and Writer. The Reference Architecture 712 has inbuilt features for Object Repository migration, Test Data migration from any Source to any Target type. Standardization, Optimization, re-usability and maintainability aspects are taken from the Reference Architecture 712 which are created over time. It is used as a basis to modernize the current automation, in such a way for easy maintenance and re-use when providing the deliverables and enabling Test Data migration from any Source to any Target type.

The Converter 709 does the parsing and lexing required to make Source files Language independent thereby simplifying migration across the platforms. The Converter 709 comprises an Object Repository Convertor 713, a Test Data Convertor 714, a Script Convertor 715, an Extractor 716, and a rule-based linker 717 that completes the generation of the converted Object Repository 718, Test Data 719 and Scripts 720 in a Target Language and forwards this to the post-processor 303 as Tool generated Source 302a.

The post-processing module 303 further comprises one or more users 725, Tool generated raw Source 302a, a Validator 721, a best practise analyser 723, a Smart (migration) Remedy Engine 722, a TODO Resolver 724 and one or more Final Scripts 735. The Tool generated raw Source 302a has Object Repository 718, Test Data 719 and Scripts 720 which is validated by the Validator 721 that checks the syntax and semantic errors in the generated Source code through a Target Language Compiler 726 and lists warnings 727, stack traces and errors 728. The Smart (migration) Remedy Engine 722 bifurcate the Technical Logs 733 and Reports 734 through its Log Engine 731 and Report Engine 732, taking inputs from the best practise analyser 723 which consists of a Suggestion Library 729 and Training Data 730. The best practise analyser 723 is trained with training Data and Suggestion Library. It analyses the errors and warnings, and do a look-up in the Training Data and Suggestion Library for generating the recommendation. The Data is further passed through the TODO Resolver 724 that has a user interface which provides options to a user 725 for resolving the ambiguity, issues, and warnings with best practise suggestions and the Final Scripts 735 are generated based on the inputs given by the user 725.

Figure 2:
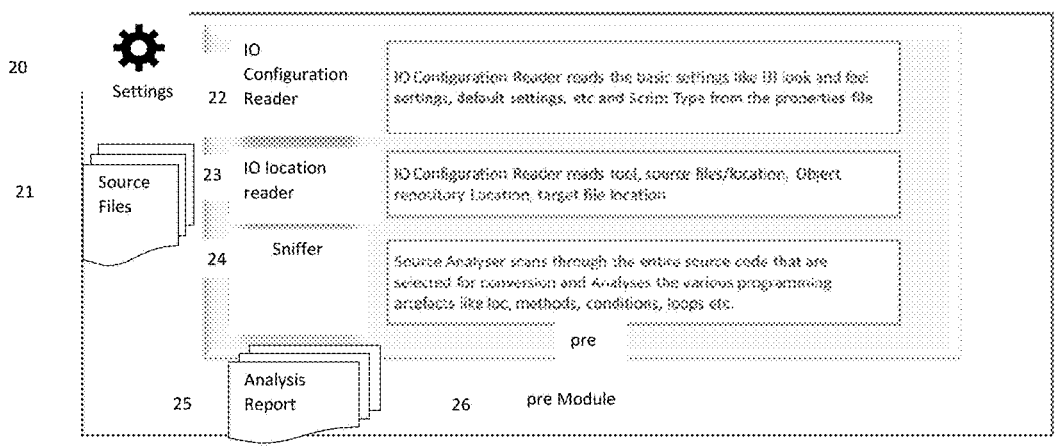
FIG. 2 illustrates the pre-processing module.

FIG. 2 shows the pre-processing module 26 in detail. The Source files 21 are input to an IO Configuration Reader 22. It reads the basic settings 20 such as UI look and feels settings, default settings, to name a few and script type from the properties file. The IO Location Reader 23 reads tool, Source files or location, Object Repository location and Target File location. The Sniffer 24 gets the high-level information about the input Source files. When the user selects the files to convert, it gets the first level of information like how many lines of code, functions, files, and complexity of the code. The Sniffer 24 scans through the entire Source code that is selected for conversion and analyses the various programming artefacts like location, methods, conditions, and loops. The output is the Analysis Report 25.

Figure 3A:
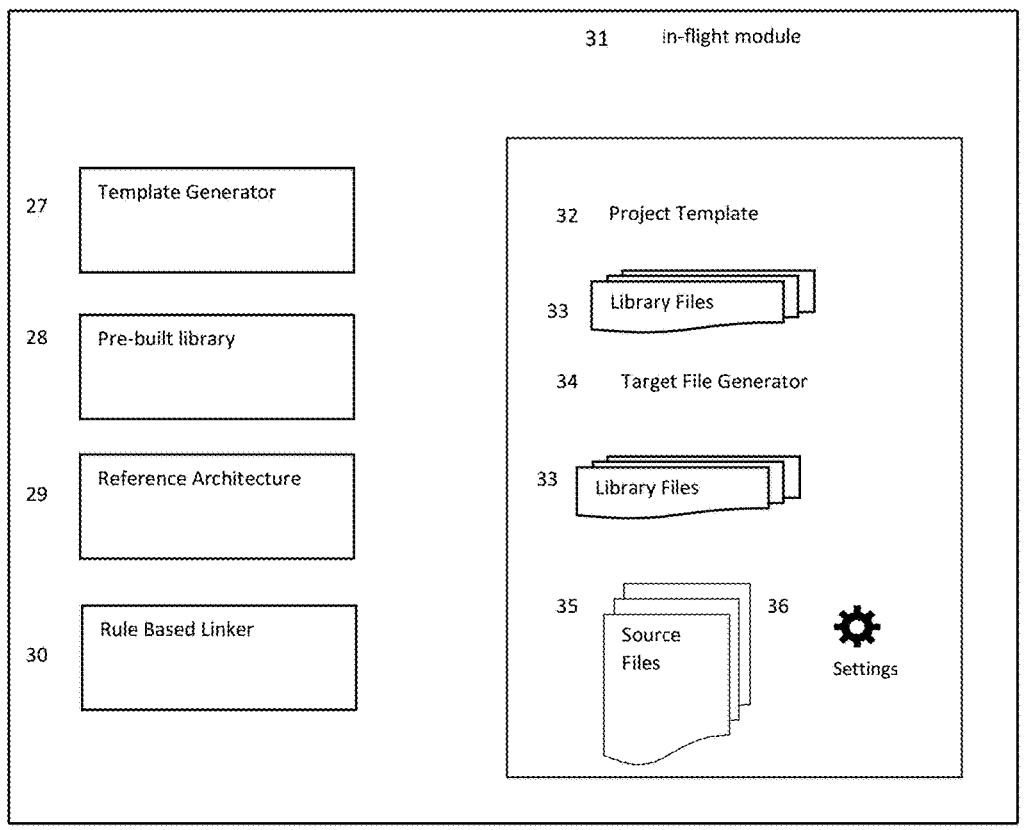
FIG. 3a shows the working of the converter and the extractor in the in-flight module.

FIG. 3a shows the working of the Converter and the Extractor in the in-flight module 31. The output of the pre-processor is the input to the in-flight module 31. The input goes to the processing in the Template Generator 27, Pre-built Library 28, Reference Architecture 29, and rule-based linker 30. Then the Target File Generator 34 generates the Target files. The Source files 35, Library files 33 and project template 32 are required for Target files to generate, along with the settings 36.

Figure 3B:
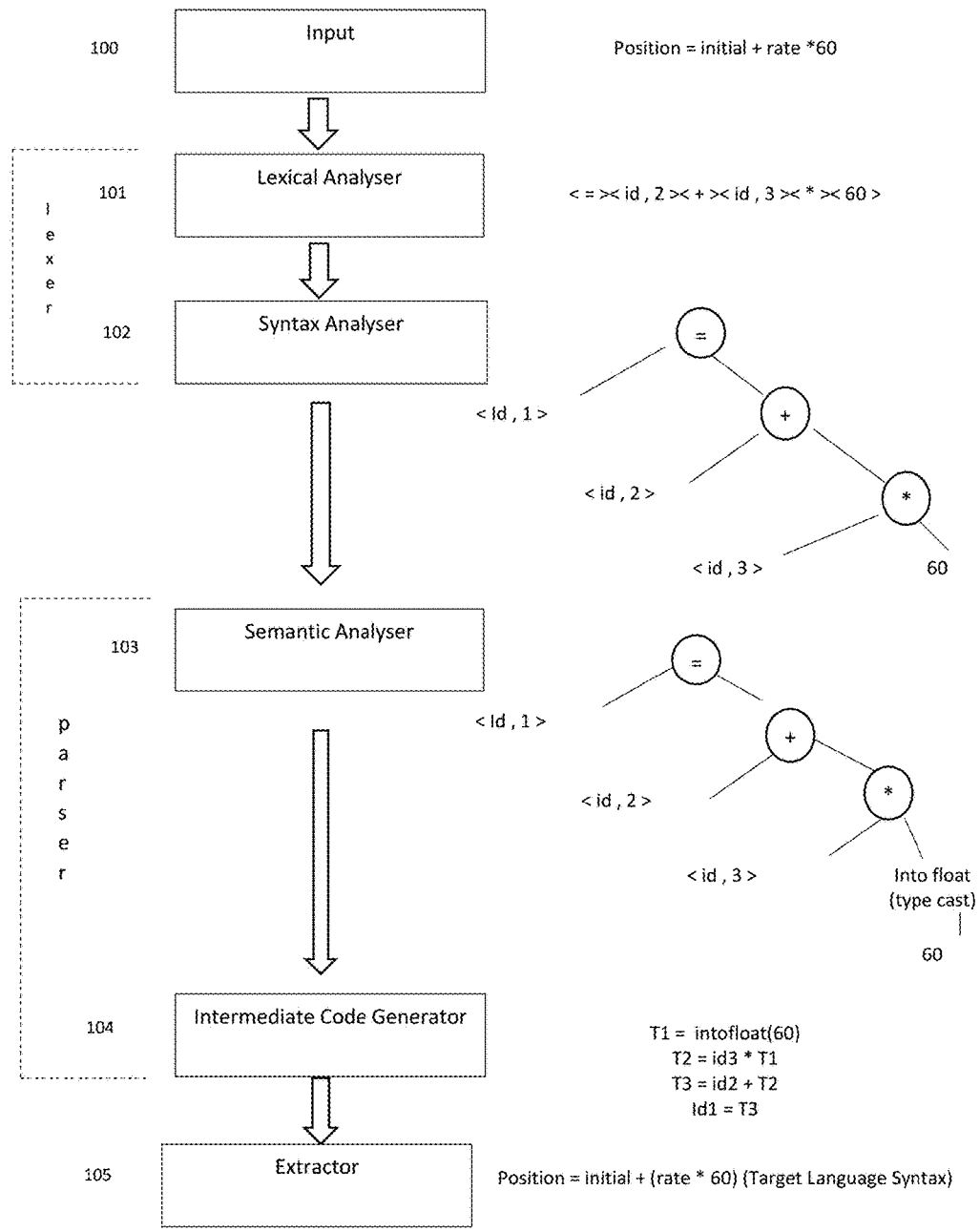
FIG. 3b describes the Target file generation in the in-flight module.

FIG. 3b describes the Target file generation in the in-flight module. The process starts 100 by receiving the input in the in-flight processing module. The input is forwarded to the Lexer, which consists of a Lexical Analyser 101 and Syntax Analyser 102. The Lexical analysis is the procedure where the character sequence like in a Web page or a computer program, is transformed into a token sequence, which has some identified meaning. The tokens generated in the Lexical Analyser 101 are forwarded to the Syntax Analyser 102. The aim of the syntactic analysis is to get the text structure which comprises of a tree of phrases in which the smallest phrases are that of basic symbols, and the largest are of a sentence. Each phrase can be displayed as a tree's node and the tree being the structure and the sentence is the root of the tree. The Lexer processing is completed, and the Data is forwarded to the Parser. The Parser consists of a Semantic Analyser 103 and an Intermediate Code Generator 104. In Semantic analysis is the syntactic structures are related, from various levels like phrases, clauses, sentences to the meanings which are independent from any Language. After the completion of analysis, the Data is passed to the Intermediate Code Generator 104 which is an adjustment of the tree produced syntactically at the time of analysis of syntax and semantics. It is formed by breaking down the tree structure into sequential instructions, each of which is equivalent to a single or a small number of machine instructions. The machine code can then be generated by the Extractor 105.

FIG. 4a shows the conversion of variables from a Language's syntax to another Language's syntax. For example, there is a variable 'a' in Source of type "Dim." "Dim" is used in VBScript. Dim statements are not to be used when there is an Option Explicit statement used in the VBScript, which means to explicitly mention the variable type like int for integer, char for a character. In many Languages, there is no need to mention a Data type (integer, string, and object). In VBScript, all variables are variants. Example:

```
Option explicit
Dim myString, price
myString="Hello world."
price=123
```

So, in FIG. 4a, Dim a=10 shows the variable 'a' declared as a variable type dim having a value equal to 10.

In the Target Language, it shows the Language JAVA. In JAVA, it is required to explicitly declare the variable in a variable type. In JAVA, int a=10 means a variable of type 'int' (integer). So, 'a' has an integer value of 10 assigned to it.

FIG. 4b shows the conversion of constants from a Language's syntax to another Language's syntax. Here, the Source Language is VBScript. In the statement const a=10, const means that the variable is constant and it is a location in memory for that variable that holds a value that is fixed and constant. There will be an error thrown if the value is tried to be changed. So in the Source Language, the value of 'a' will remain 10 always as it is declared as a constant.

In the Target Language, public static final int a=10; is written in JAVA Language. public is an access modifier. A public variable indicates that the variable is accessible everywhere in the class, in the package or outside the package in JAVA. It has the widest scope among all other modifiers. static means that in place of each instance (object) having a variable in a class, the variable as a whole is now related to the class. final means that the value assigned is fixed and cannot be changed. It indicates that the variable is an integer which is constant for all instances of a certain class at all times. So, public static final int a=10; shows a variable 'a' that can be accessed anywhere in the package, method or a class, and has a constant value for all the instances (objects) of the class.

FIG. 4c shows the conversion of Conditional Operators and Conditional statements from a Language's syntax to another Language's syntax. The Source Language is VBScript, and in VBScript, there are message boxes which are prompted by certain conditions, and the conditions are checked with Conditional Operators and Conditional statements. In Source Language, there is a comparison between three variables to find the greatest.

```
If a > b AND a > c Then
    MsgBox "a is greater"
ElseIf b>c AND b>a Then
    MsgBox "b is greater"
Else
    MsgBox "c is greater"
End If
```

Here, If, ElseIf, Else, and End If are the Conditional Operators. It shows that if 'a' is greater than 'b' and 'c', then the message box should come up with a message that 'a' is greater. Else, if b is greater than 'c', and 'a' then the message box should come up with a message indicating ' b' is greater or else at the end, if no conditions satisfy, then the message box should come up with a message that 'c' is greater.

The Target Language is the JAVA Language.

```
if (a>b && a>c) {
    System.out.println("a is greater");
} else if (b>c && b>a) {
    System.out.println("b is greater");
} else {
    System.out.println("c is greater");
}
```

Here in the Target Language, there is a comparison between three variables to find the greatest. Again, here is the use of Conditional Operators and Conditional statements. If, else and else if are Conditional Operators and System.out.println prints the message on the screen, written in the brackets. A message gets printed on the screen that 'a' is greater, if 'a' is greater than both the variables 'b' and 'c', or else it is printed that 'b' is greater if 'b' is greater than 'a' and 'c', or else at the end, if no conditions satisfy, then a message is printed that 'c' is greater.

FIG. 4d shows the conversion of various loops likes, for, while, a do-while loop from a Language's syntax to another Language's syntax. The Source Language is VBScript here. There are many kinds of loops in the Language for the calculations to be done. The for loop is used here out of all the loops such as

```
for, while, a do-while.
For i = 1 To 5 Step 1
    MsgBox i
Next
```

Here in the code, there is a variable 'i' which is incremented by a value 1 each time till 'i' reaches the value of 5 and the value is printed by the message box. The loop goes on till the value reaches 5.

The Target Language is in JAVA Language.

```
for (int i=1;i<=5;i++) {
    System.out.println(i);
}
```

Also, loops are used. In the for loop, there is a condition that the variable 'i' of type integer has the value of 1 and will be incremented by 1 in each iteration and will go on, till 'i' has the value of 5. All the values of 'i' will be printed on the screen by the statement System.out.println.

FIG. 4e shows the mapping and transformations of keywords from a Language's syntax to another Language's syntax. The Source Language is VBScript here. VBScript has for, while loops and dim as the keyword, and in the Target Language which is JAVA, int, float are the variable types, static is a keyword, and while is a loop.

FIG. 4f shows the conversion of user-defined methods from a Language's syntax to another Language's syntax. In VBScript which is the Target Language, VBScript procedures, are used mainly for better code organization and re-use. In VBScript, there are two type in Procedures, (a) Sub procedures, and (b) Function Procedures. The Sub Procedure can be used, if no value to be returned, and can use Function Procedures for returning a value, by executing a series of statements.

```
Sub Test
    print "hello."
End Sub
Function add(a,b)
    return a+b
End Function
```

Here a Function procedure is used to return a value of add procedure of variables 'a' and 'b.'

In the Target Language JAVA, methods are used.

```
public void Test( ) {
    System.out.println("hello");
}
public int add(int a, int b) {
    return a+b;
}
```

Here the variables are of int type 'a' and 'b,' and the name of the method is public int add, which means the method can be accessed anywhere in JAVA package, class or method as public is used, and will return a value of int as int is mentioned before add.

FIG. 4g shows the conversion of Object Repositories and Object Identification Mechanism from a Language's syntax to another Language's syntax.

Unified Functional Testing (UFT) has an Object Repository that has a group of objects and properties that help in recognising the objects and thus using them. If the Source is UFT where VBScript is the programming Language, the .tsr file is an Object Repository and .xls, .txt, .xml is the test Data.

In SELENIUM, the programming Language can be Ruby, Python, JAVA or C Sharp. There is no Object Repository concept. In other automation tools, these are stored in another tool specific format.

Figure 5A:
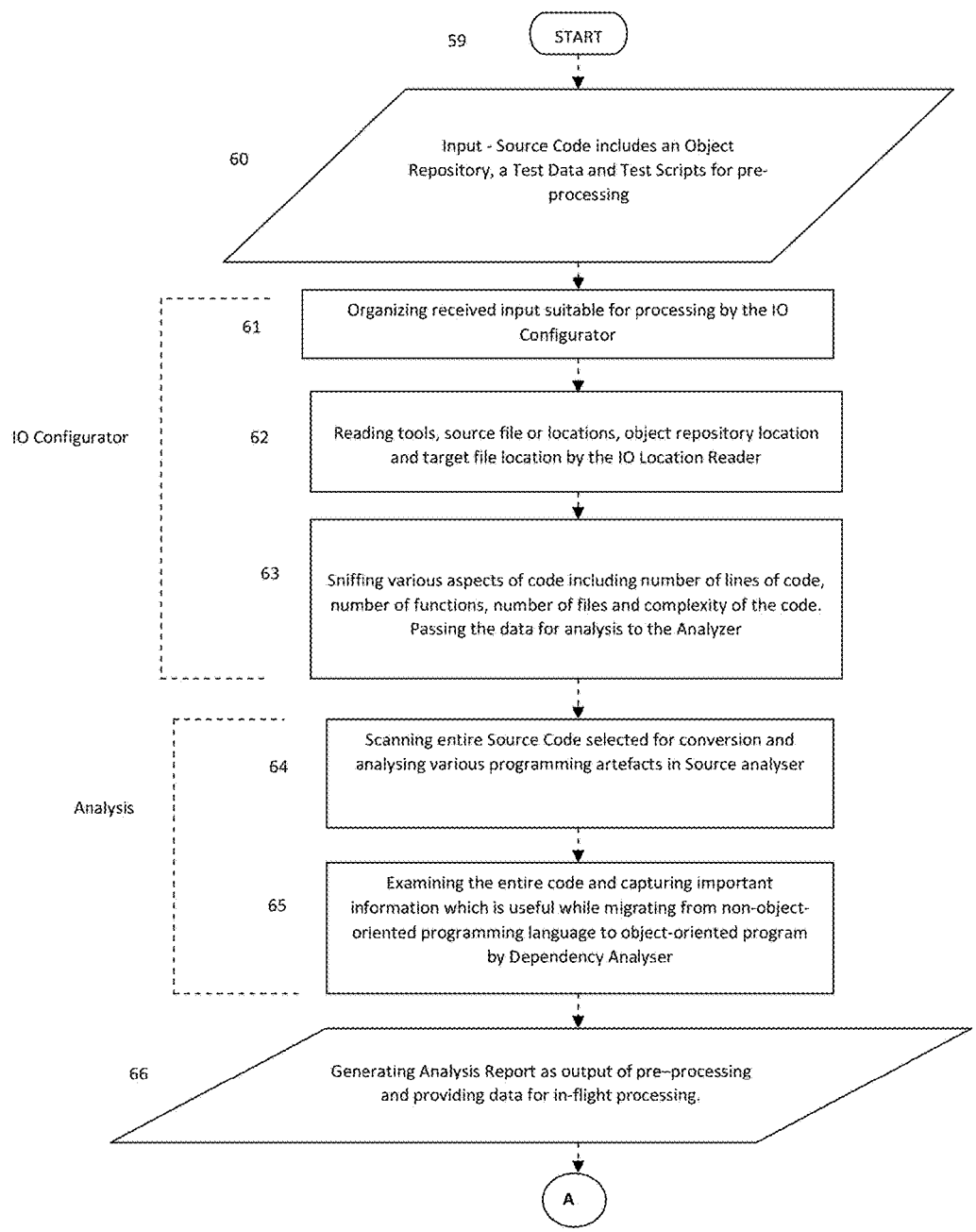
FIGS. 5a-5c describes the method of the present invention.

FIG. 5a describes the pre-processing which starts 59 with the input being the Source Code that includes an Object Repository, a Test Data and Test Scripts which are fed for pre-processing 60.

The IO Configurator organizes the received input suitable for further processing 61. The IO Location Reader, part of the IO Configurator, does the reading of the tools, Source file or locations, Object Repository location and Target file location 62. The Sniffer also is a part of IO Configurator, understands the complexity of the code when a user selects the Source code to convert, and scans through the code and shows the users, the number of lines of code, the number of functions, the number of files and the complexity of the code 63. The Data is passed on further for the Analysis. The Source Analysis is done by scanning the entire Source Code selected for conversion and analysing the various programming artefacts like location, methods, conditions, loops 64. Examining the entire code and capturing important information which is useful while migrating from a non-object-oriented programming Language to an object-oriented program is in Dependency analysis 65. Analysis Report is generated as the output of the pre-processing and Data is provided for the in-flight processing 66.

Figure 5B:
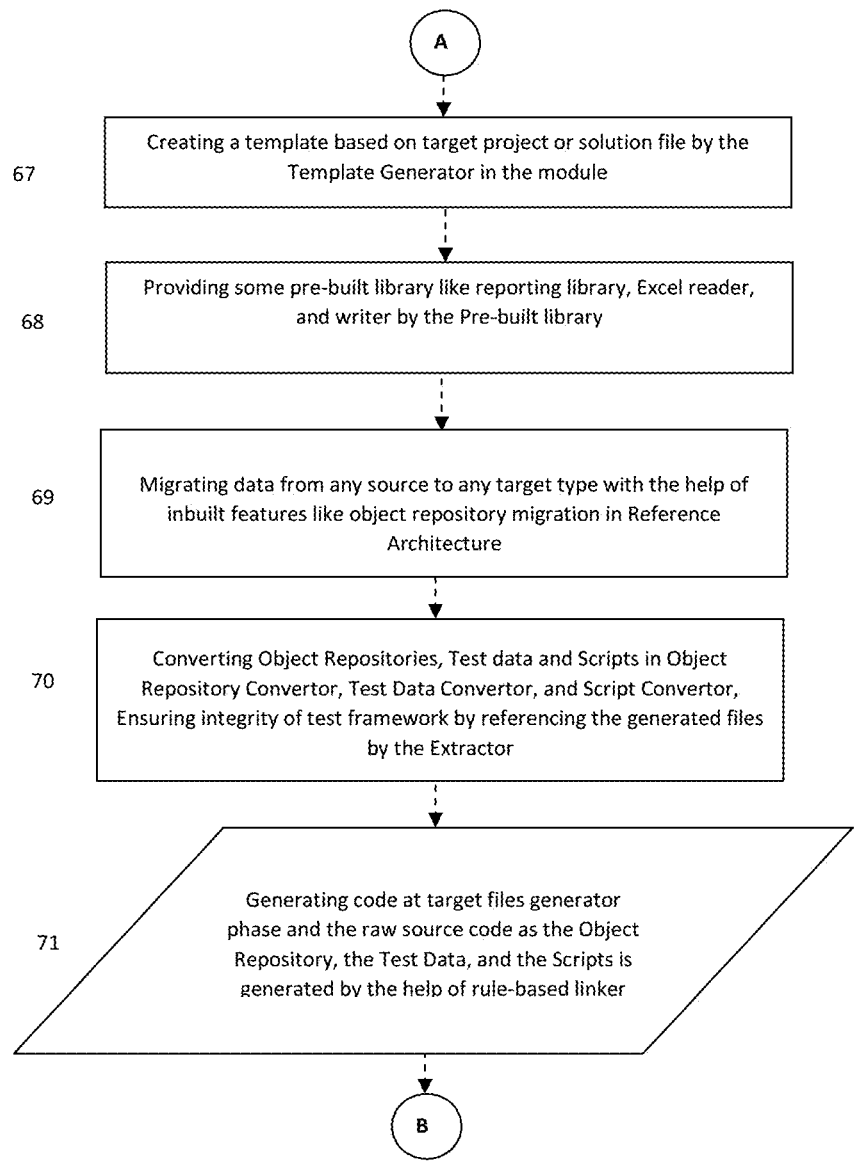

FIG. 5b describes the in-flight processing, in which a template is created, based on Target Project or Solution File by the Template Generator 67. Adding some pre-built Library such as reporting Library, Excel Reader, and Writer is the function of the Pre-built Library 68.

The Reference Architecture has inbuilt features for Object Repository migration, Test Data migration from any Source to any Target type 69. Standardization, Optimization, reusability and maintainability aspects are taken from the Reference Architecture which is created over time. It is used as a basis to modernize the current automation, in such a way for easy maintenance and re-use when providing the deliverables and enabling Test Data migration from any Source to any Target type. Ensuring the integrity of test framework by referencing the generated files by the Extractor and the rule-based linker 70. The rule-based linker 71 helps in Target files generation and the raw Source Code as the Object Repository, the Test Data and the Script are fed for the post-processing.

Figure 5C:
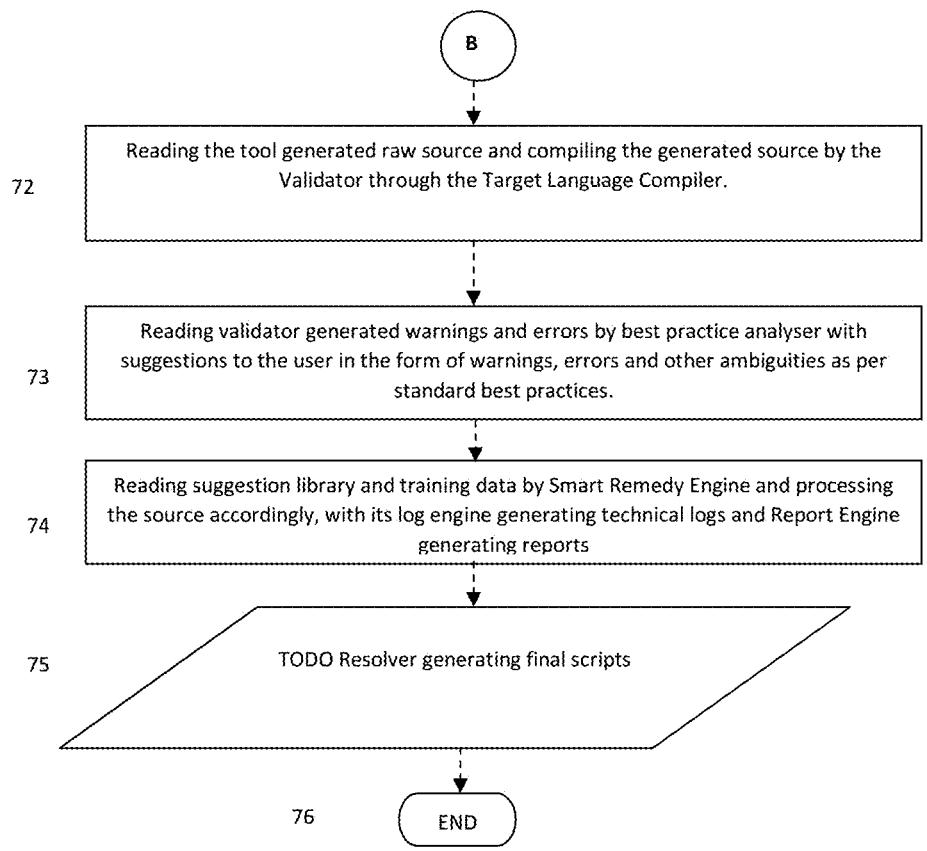

FIG. 5c describes the post-processing, the validation of Data is done 72 by the Validator that checks the syntax and semantic errors in the generated Source Code through the Target Language Compiler and generates the warnings and errors that are passed on to the Smart (migration) Remedy Engine. The Smart (migration) Remedy Engine bifurcates 73 the Technical Logs and the Reports through its Log Engine and Report Engine, taking inputs from the Suggestion Library and the Training Data, which are part of the best practise analyser. The Data is further passed 74 through a TODO Resolver which has a user interface. At the end 76, the Final Scripts are generated 75.

Post remediation, the system shows the errors, warnings and other code that are not converted. Technical User who has knowledge on the target tool will go through them manually and fixes appropriately. However, the suggestions are provided by the system, but it is the end user's decision to accept the suggestion or fixing.

The process further comprising the steps of displaying the conversion path, Target Language, Source, and Target location with Source and destination lines of code, with the Project name and the conversion time, along with the line number for the error with the error, line number for the warnings along with the warnings and shows the Target code converted by the Source code.

REFERENCES

1. "What is Software Testing? Introduction, Basics & Importance", Guru99, 2017.
2. "The Evolution of Software Testing", QualiTest (blog), Dec. 5, 2013.
3. "Manual and Automation testing Challenges," Software Testing Help, Apr. 17, 2017.
4. "What are the key challenges of Software Testing?", HtwokQA, Jul. 13, 2015, H2K Infosys, LLC.
5. "Introduction to Selenium", Guru99, 2017.
6. "Selenium Tutorial", Tutorials Point, 2017.

The invention claimed is:

1. A system having a hardware processor for test tool migration between at least one Source Languages and at least one Target Languages, in automation testing with a pre-processing module, an in-flight module and a post-processing module having Source Code as input that includes an Object Repository (701), a Test Data (702) and Test Scripts (703), the system comprising:
   a) a pre-processing module (301), which takes the Source Code (700) in a Source Language as input and comprises an input/output (IO) Configurator (704) and an Analyser (705), wherein:
      i) the IO Configurator (704), which has an input/output (IO) Configuration Reader (22), an input/output (IO) Location Reader (23) and a Sniffer (24), is configured such that the Source files (21) are input to the IO Configuration Reader (22), which reads basic settings (20) including user-interface (UI) look and feels settings, default settings and script types from a properties file, and is configured such that the IO Location Reader (23) reads the location of Source files, Object Repositories and Target files;

ii) the Sniffer (24) is configured to get high-level information about the Source Code (700) including the first level of information about lines of code, functions, files, and complexity of the code, and is configured to scan through the entire Source code that is selected for conversion, and configured to analyze various programming artefacts selected from a group consisting of a location, a method, a condition, and a loop;

iii) the Analyser (705) comprises a Source Analyser (706) and a Dependency Analyser (707) configured such that:

the Source Analyser (706) scans the entire Source Code (700) selected for conversion and analyses various programming artefacts selected from a group consisting of methods, conditions, and loops, based on the Source Language; and the Dependency Analyser (707) examines the Source Code (700) for dependency artefacts based on the Target Language; and iv) the pre-processing module produces intermediate Analysis Reports (25);

b) an in-flight module (302), which takes inputs from the pre-processing module and comprises a Template Generator (708) and a Converter (709) that work together to produce Tool generated raw Source (302a), the converter (709) configured to perform the parsing and lexing required to make a Source Language of the Source files (21) independent, and which simplifies the migration across to a Target platform selection, and the Template Generator (708) configured to generate an appropriate template of a Test Scripts (703) in a Target Language, based on the Target platform selection, the in-flight module further comprising a Lexer consisting of a Lexical Analyser (101), a Syntax Analyser (102), and a Parser including a Semantic Analyser (103) and Intermediate Code Generator (104) and that works to make Source file Language independent and simplifies migration, wherein:

i) the in-flight module (31) takes inputs from the pre-processor module (26) from the Sniffer (24) and the Dependency Analyser (707), such that the Converter (709) does parsing and lexing; and ii) the Converter (709) reads Language independent code and Language independent Object Repositories and converts them to a neutral Language and then to a Target platform, such that the neutral Language is an intermediate low-level Language which can connect to both the Source Language and the Target Language; and c) a post-processing module (303), which reads the Tool generated raw Source (302a) and further comprises a Validator (721), a Smart (migration) Remedy Engine (SME) (722), a best practise analyser (723), a TODO resolver (724) to generate Final Scripts (735) in a Target Language, including Technical Logs (733) and Reports (734) for analysis, wherein the post-processing module further comprises (a) at least one users (725), (b) Tool generated raw Source (302a), (c) a Validator (721), (d) a best practise analyser (723), (e) a Smart migration Remedy Engine (722), (f) a TODO Resolver (724), and (g) at least one Final Scripts (735) wherein:

i) the Tool generated raw Source (302a) comprises an Object Repository (718), Test Data (719) and Scripts (720);

ii) the Validator (721) validates the Tool generated raw Source (302a) for syntax and semantic errors through a Target Language Compiler (726), checking the lines of the Source for Target Language Syntax and Target Language Semantics and lists warnings (727), stack traces and errors (728);

iii) the best practise analyser (723) comprises a Suggestion Library (729) and Training module (730) that provide inputs on remedying the Tool generated raw Source (302a) based on historical Data;

iv) the Smart migration Remedy Engine (722) consists of a Log Engine (733) and a Report Engine (734) that take inputs from the Training module (730) and produce Technical Logs (733) and Reports (734) to aid and autocorrect remediation process;

v) the TODO Resolver (724) consists of a user interface and provides options to the user (725) for resolving the ambiguity, issues, and warnings with best practise suggestions; and vi) the Final Scripts (735) are generated based on the inputs given by the user (725) in the TODO Resolver (724).

2. The system for test tool migration of claim 1, wherein the Dependency Analyser (707) further captures important information which is useful while migrating from a non-object-oriented programming Language to an object-oriented programming Language.

3. The system for test tool migration of claim 1, wherein the in-flight module (302) further comprises:

a) a Template Generator (708) which has a Target Project or Solution File (710), a Pre-built Library (711), and a Reference Architecture (712) wherein:

i) the Template Generator (708) creates a template based on a Target Project or Solution File (710);

ii) the Pre-built Library (711) adds some pre-built functions including reporting Library, Excel Reader, and Writer; and iii) the Reference Architecture (712) that consists of inbuilt features including Object Repository migration, Test Data migration from any Source to any Target type, and standardisation, optimization, reusability and maintainability aspects are taken from the Reference Architecture (712) which are created over time and is used as a basis to modernize the current automation, in such a way for easy maintenance and re-use when providing the deliverables and enabling Test Data migration from any Source to any Target type; and b) the Converter (709) further comprises (i) an Object Repository Convertor (713), (ii) a Test Data Convertor (714), (iii) a Script Convertor (715), (iv) an Extractor (716), and (v) a rule-based linker (717) that completes generation of the converted Object Repository (718), Test Data (719) and Scripts (720) in a Target Language and forwards this to the post-processor (303) as Tool generated Source (302a), such that:

i) the Extractor (716) is responsible for ensuring the integrity of the test framework by referencing the generated files and has a Utility Library Extractor that generates appropriate and supported Library functions based on the Target Language selection; and ii) the rule-based linker (717) links them appropriately based on inputs from the Reference Architecture (712).

4. The system for test tool migration of claim 1, wherein:
a) the Lexical Analyser (101) reads input (100), which is then grouped into meaningful tokens as output;
b) the output from step 'a' is then sent to the Syntax Analyser (102) wherein a Parser uses the first component of the tokens produced by the Lexical Analyser (101) to create a tree-like intermediate representation that depicts the grammatical structure of token stream;
c) the Semantic Analyser (103) makes the use of the syntax tree and the symbol table's information to check for semantic consistency with Language definition of the Source program and does type checking, where the Semantic Analyser (103) checks if the operator has matching operands;
d) post the analysis of step 'c', the Intermediate Code Generator (104) generates the intermediate code in the process of translating from the Source Language to the Target Language; and
e) the Extractor (105) generates the Target Language code from the neutral Language.

\* \* \* \* \*